Patented Apr. 13, 1954

2,675,386

UNITED STATES PATENT OFFICE 2,675,386

2-4-DIETHYLENEIMINO PYRIMIDINES AND PROCESS OF PREPARING SAME

James Allan Hendry, Ronald Frederick Homer, and Francis Leslie Rose, Blackley, Manchester, England, assignors to Imperial Chemical Industries Limited, a corporation of Great Britain No Drawing. Application February 19, 1951, Serial No. 211,802

Claims priority, application Great Britain February 28, 1950

16 Claims. (Cl. 260—256.4)

This invention relates to new pyrimidine derivatives and more particularly it relates to new pyrimidine derivatives.

According to the invention we provide new pyrimidine derivatives characterised in that they bear in the 2-, 4- (or 6-) positions two ethyleneimino substituents and which optionally may bear one or more further non-acidic substituents.

According to a further feature of the invention we provide a process for the manufacture of the said new pyrimidine derivatives which comprises reacting a pyrimidine derivative which bears in the 2-, 4-, (or 6) positions at least two halogen substituents and which optionally may bear one or more further non-acidic substituents with ethyleneimine or with an alkali metal, preferably the lithium, derivative thereof.

The reaction is conveniently brought about by bringing the halogenopyrimidine into contact with ethyleneimine in a suitable liquid medium, for example water, preferably in the presence of an acid-binding agent, for example, an alkali metal carbonate or triethylamine.

According to yet a further feature of the invention such of the new pyrimidine derivatives made by the said process as contain a residual halogen atom are further reacted with an alkali metal alkoxide.

According to a still further feature of the invention such of the new pyrimidine derivatives made by the said process as contain a nitro group are subjected to reduction by means of hydrogen.

The invention is illustrated but not limited by the following examples in which the parts are by weight:

Example 1

To a stirred solution of 2.9 parts of anhydrous sodium carbonate and 2.6 parts of ethylene imine in 50 parts of water there are added 4.85 parts of 5-nitro-4:6-dichloropyrimidine (obtained by condensation of formamidine with diethyl malonate, followed by nitration of the so-obtained 4:6-dihydroxypyrimidine and then by chlorination of the resulting 5-nitro-4:6-dichloropyrimidine with phosphorus oxychloride in presence of dimethylaniline). The temperature of the mixture is kept at 40° C. for 1 hour and it is then filtered. There is obtained a solid residue of 5-nitro-4:6-bis-(ethyleneimino)-pyrimidine which is recrystallised from methanol and then has melting point about 130° C. with decomposition.

Example 2

5 parts of 5-nitro-4:6-dichloro-2-methylpyrimidine (obtained as described by Huber and Hölscher, Ber., vol. 71B, page 87) are added to a stirred solution of 2.9 parts of anhydrous sodium carbonate and 2.6 parts of ethylene imine in 50 parts of water. The mixture is stirred at 40-45° C. for 1 hour and is then filtered. The solid thus obtained is 5-nitro-4:6-bis-(ethyleneimino)-2-methylpyrimidine which is purified by crystallisation from methanol. The substance decomposes when heated.

Example 3

To a stirred solution of 2.9 parts of anhydrous sodium carbonate and 2.6 parts of ethyleneimine in 50 parts of water are added 4.85 parts of 5-nitro-2:4-dichloropyrimidine (obtained by nitration of uracil and chlorination of the product with phosphorus oxychloride in the presence of dimethylaniline). The temperature of the mixture is kept at 40-45° C. for 1 hour and it is then filtered to give a solid residue of 5-nitro-2:4-bis-(ethyleneimino)-pyrimidine which is crystallised from ethyl acetate and then melts at about 160° C., the precise M. P. depending on the rate of heating.

Example 4

3.1 parts of ethyleneimine and 7.25 parts of triethylamine are dissolved in 50 parts of dry benzene and the solution is stirred while 3.3 parts of 2:4:6-trichloropyrimidine are added over a period of 20 minutes keeping the temperature at or below 30° C. The reaction mixture is stirred at 30° C. for 90 minutes and is then filtered. The filtrate is evaporated in vacuo and the residue is extracted with light petroleum of boiling range 60-80° C. under reflux. The cooled extracts deposit 6-chloro-2:4-bis-(ethyleneimino)-pyrimidine which is crystallised from the same solvent and has melting point 95-96° C.

Example 5

To a stirred solution of 3.0 parts of ethyleneimine and 7.25 parts of triethylamine in 50 parts of benzene is added 6.75 parts of 2-phenyl-5-nitro-4:6-dichloropyrimidine (M. P. 168-9° C., obtained by nitration of 2-phenyl-4:6-dihydroxypyrimidine and chlorination of the product with phosphorus oxychloride in the presence of dimethylaniline). The stirred suspension is maintained at 40° C. for 20 minutes and is then filtered. The filtrate is evaporated in vacuo and the residue of 2-phenyl-5-nitro-4:6-bis-(ethyleneimino) pyrimidine is crystallised from a mixture of methanol and ethyl acetate. The pure material polymerises when heated.

Example 6

To an ethereal solution of lithium ethyleneimine obtained from 1.4 parts of lithium metal by the method of Gilman et al. (Journal of the American Chemical Society, volume 67, page 2106) there is added with stirring a solution of 4.5 parts of 2-phenyl-4:6-dichloropyrimidine (obtained by treatment of 2-phenyl-4:6-dihydroxypyrimidine with phosphorus oxychloride) in 40 parts of dry ether during 30 minutes. The reaction mixture is stirred at the boil for 1 hour further, cooled, and poured into 100 parts of iced water. The ether layer is separated and the aqueous layer is twice extracted with 100 parts of ether. The combined ethereal solutions are dried over anhydrous sodium sulphate and then evaporated. The residue of 2-phenyl-4:6-bis-(ethyleneimino)-pyrimidine is crystallised from light petroleum of boiling range 60–80° C. and has M. P. 111–112° C.

Similarly, by using 5.5 parts of 2-β-naphthyl-4:6-dichloropyrimidine in place of the 2-phenyl-4:6-dichloropyrimidine there is obtained 2-β-naphthyl-4:6-(bis-ethyleneimino)-pyrimidine which, after crystallisation from ethyl acetate, has M. P. 156–158° C.

Example 7

A mixture of 35 parts of 5-phenyl-barbituric acid, 168 parts of phosphorus oxychloride and 35 parts of dimethylaniline is boiled for 1 hour. It is then poured onto crushed ice and filtered. The solid residue is crystallised from light petroleum B. P. 60–80° C. and 5-phenyl-2:4:6-trichloropyrimidine, M. P. 160° C., is obtained.

14.6 parts of 5-phenyl-2:4:6-trichloropyrimidine so obtained are added with stirring to a mixture of 10 parts of ethylene imine, 25 parts of triethylamine and 200 parts of benzene and the mixture is then heated at 35–40° C. for 1 hour. It is then filtered and the filtrate evaporated under reduced pressure below 40° C. and the solid residue is extracted with boiling petroleum ether of B. P. 60–80° C. The extract is evaporated and the residual 5-phenyl-6-chloro-2:4-bis-(ethyleneimino)-pyrimidine is crystallised from light petroleum, B. P. 60–80° C. It has M. P. 116–118° C.

Example 8

To a solution of 1.2 parts of sodium in 65 parts of dry methyl alcohol there are added 8.8 parts of 6-chloro-2:4-(bisethyleneimino)-pyrimidine. The mixture is heated at 50° C. for 1 hour. It is then filtered and the filtrate is evaporated under reduced pressure. The residue of 6-methoxy-2:4-bis-(ethyleneimino)-pyrimidine is crystallised from light petroleum of B. P. 60–80° C. and has M. P. 86° C.

In a similar manner by the use of ethyl alcohol in place of methyl alcohol there is obtained 6-ethoxy-2:4-bis-(ethyleneimino)-pyrimidine which is a liquid of boiling point 107° C. at 0.1 mms. pressure. Similarly by the use of isopropyl alcohol as solvent there is obtained 6-isopropoxy-2:4-bis-(ethyleneimino)-pyrimidine as a liquid of B. P. 114° C. at 0.2 mms. pressure.

Example 9

3 parts of 5-nitro-2-phenyl-4:6-bis-(ethyleneimino)-pyrimidine are dissolved in a mixture of 35 parts of methyl alcohol and 35 parts of benzene and 1 part of Raney nickel catalyst is added. The mixture is then shaken in hydrogen at atmospheric pressure and temperature until absorption of hydrogen ceases. The mixture is then filtered and the filtrate is evaporated under reduced pressure and the residue is crystallised from acetone to give 5-amino-2-phenyl-4:6-bis-(ethyleneimino)-pyrimidine, M. P. 147–148° C.

Example 10

To a solution of 2.6 parts of ethylene imine and 6.1 parts of triethylamine dissolved in 50 parts of benzene is added with stirring 6.4 parts of 2-β-naphthyl-5-nitro-4:6-dichloropyrimidine (M. P. 218–9° C., obtained by condensation of β-naphthamidine with diethyl malonate in the presence of sodium ethoxide, then nitrating the resulting 2-β-naphthyl-4:6-dihydroxypyrimidine and chlorinating the resulting 5-nitro-2-β-naphthyl-4:6-dihydroxypyrimidine with phosphorus oxychloride in the presence of dimethyl aniline). The mixture is stirred at 35–40° C. for 2 hours and then filtered. The solid is extracted with cold water and the residual 2-β-naphthyl-5-nitro-4:6-bis-(ethyleneimino)-pyrimidine is crystallised from ethyl acetate and has M. P. 170° C. (decomp.).

Example 11

5 parts of 2-dimethylamino-4:6-dichloro-5-nitropyrimidine (obtained by condensation of dimethylguanidine with diethyl malonate, nitration of the so-obtained 2-dimethylamino-4:6-dihydroxypyrimidine followed by chlorination of the product by means of phosphorus oxychloride in presence of dimethylaniline) are dissolved in 20 parts of benzene and the solution is added slowly to a stirred solution of 3 parts of anhydrous sodium carbonate and 2 parts of ethyleneimine in 50 parts of water, the temperature being kept at 35° C. The mixture is then stirred at 35° C. for 4 hours. It is then filtered, the benzene layer of the filtrate is separated and evaporated under reduced pressure and the solid residue is combined with the filtration residue. The combined solid so obtained is crystallised from a mixture of acetone and methanol and consists of 2-dimethylamino-4:6-(bis-ethyleneimino)-5-nitropyrimidine, which polymerises when heated.

What we claim is:

1. As new compounds, pyrimidine derivatives having the general formula

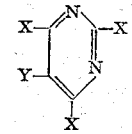

wherein two of the X substituents represent ethyleneimino substituents and the third X substituent and the Y substituent represent radicals selected from the group consisting of hydrogen, nitro, alkyl, halogen, phenyl, β-naphthyl, alkoxy and alkylamino.

2. A process for the manufacture of pyrimidine derivatives of the type described in claim 1, which comprises reacting a halogeno pyrimidine derivative of the formula

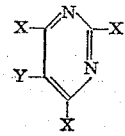

wherein two of the X substituents represent halogen and the other X substituent and the Y substituent represent radicals selected from the group consisting of hydrogen, nitro, alkyl, halogen, phenyl, β-naphthyl, alkoxy and alkylamino, with a member of the group consisting of ethyleneimine and alkali metal derivatives thereof.

3. Process as claimed in claim 2 wherein the alkali metal derivative of ethyleneimine is the lithium derivative.

4. Process as claimed in claim 2 wherein the halogenopyrimidine is brought into contact with the ethyleneimine in a liquid medium and in presence of an acid-binding agent.

5. Process for the manufacture of new pyrimidine derivatives characterised in that such of the new pyrimidine derivatives made by the process of claim 2 as contain a residual halogen atom are reacted with an alkali metal alkoxide.

6. Process for the manufacture of new pyrimidine derivatives characterised in that such of the new pyrimidine derivatives made by the process of claim 2 as contain a nitro group are subjected to reduction by means of hydrogen.

7. As new compounds, the pyrimidine derivatives of claim 1, wherein the Y substituent is nitro.

8. As new compounds, the pyrimidine derivatives of claim 1, wherein the third X substituent is halogen.

9. As new compounds, the pyrimidine derivatives of claim 1, wherein the Y substituent is nitro and the third X substituent is alkyl.

10. As new compounds, the pyrimidine derivatives of claim 1, wherein the Y substituent is hydrogen and the third X substituent is alkoxy.

11. As new compounds, the pyrimidine derivatives of claim 1, wherein the Y substituent is hydrogen.

12. As a new compound, 6-methoxy-2:4-bis-(ethyleneimino)-pyrimidine.

13. As a new compound, 5-nitro-4:6-bis-(ethyleneimino)-2-methyl pyrimidine.

14. As a new compound, 6-ethoxy-2:4-bis-(ethyleneimino)-pyrimidine.

15. As a new compound, 6-isopropoxy-2:4-bis-(ethyleneimino)-pyrimidine.

16. 2,4 - diethyleneimino - 6 - chloropyrimidine having the following formula:

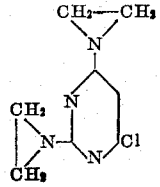

No references cited.